United States Patent [19]

Bott

[11] 4,155,585
[45] May 22, 1979

[54] VARIABLE POSITION WIND DEFLECTOR

[76] Inventor: John A. Bott, 931 Lake Shore Dr., Grosse Pointe Shores, Mich. 48236

[21] Appl. No.: 798,575

[22] Filed: May 19, 1977

[51] Int. Cl.² .................. B60J 1/00; B62D 35/00
[52] U.S. Cl. ..................... 296/1 S; 296/91; 224/324
[58] Field of Search ................. 296/91, 1 S; 224/42.1 D, 42.1 R, 42.1 F, 42.1 G

[56] References Cited

U.S. PATENT DOCUMENTS

| | | | |
|---|---|---|---|
| 2,979,165 | 4/1961 | McCambridge | 296/1 S |
| 3,089,728 | 5/1963 | Shumaker | 296/91 |
| 3,097,882 | 7/1963 | Andrews | 296/91 |
| 3,330,454 | 7/1967 | Bott | 296/91 X |
| 3,623,745 | 11/1971 | Taylor | 296/1 S |
| 3,822,910 | 7/1974 | Wiley | 296/1 S |

Primary Examiner—Philip Goodman
Attorney, Agent, or Firm—Harness, Dickey & Pierce

[57] ABSTRACT

There is disclosed herein a variable position wind deflector assembly adapted to be attached to a luggage rack or other portion of a motor vehicle including locking means for releasably securing the deflector in selected positions. The wind deflector assembly of the present invention includes a pair of spaced frame members having a deflector member extending therebetween. The frame members are each hingedly secured to support members and are provided with locking means for securing the deflector and associated frame members in one or more predetermined positions relative to the support means.

3 Claims, 6 Drawing Figures

U.S. Patent        May 22, 1979        4,155,585
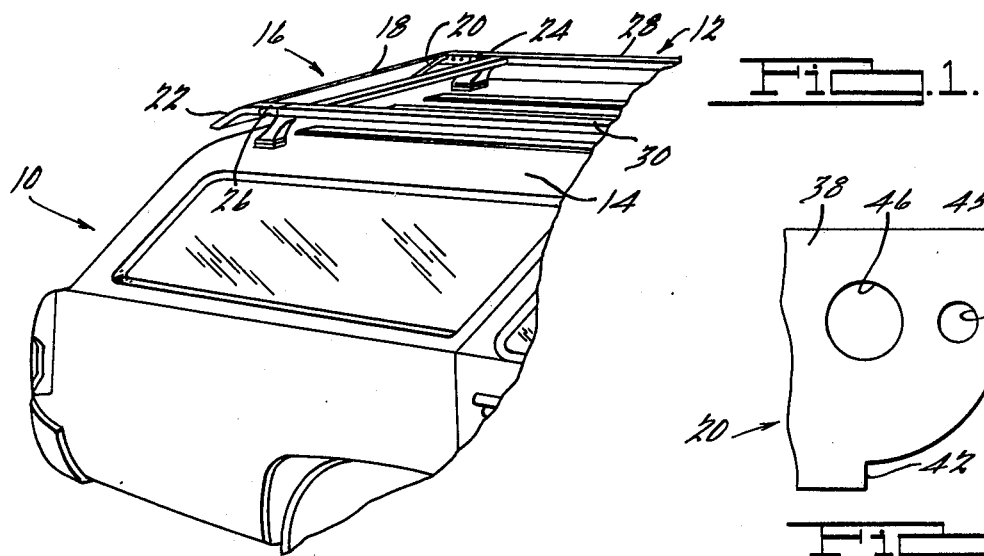
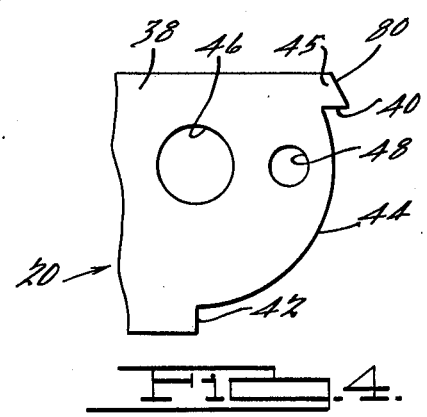
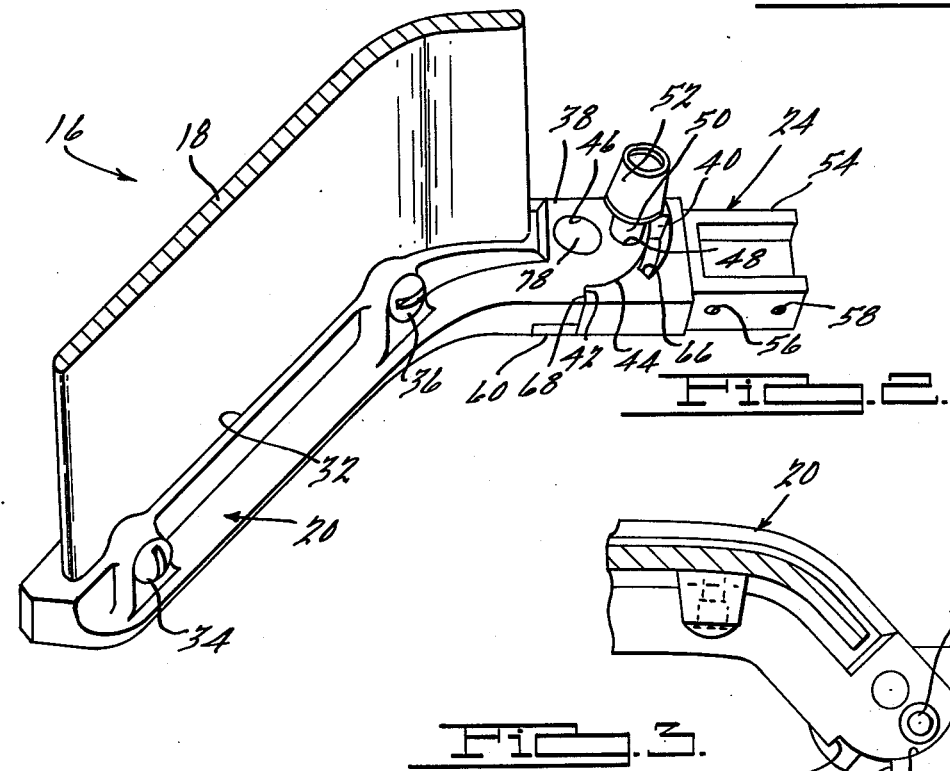
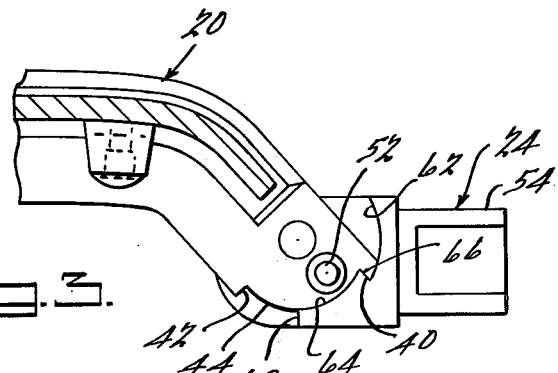
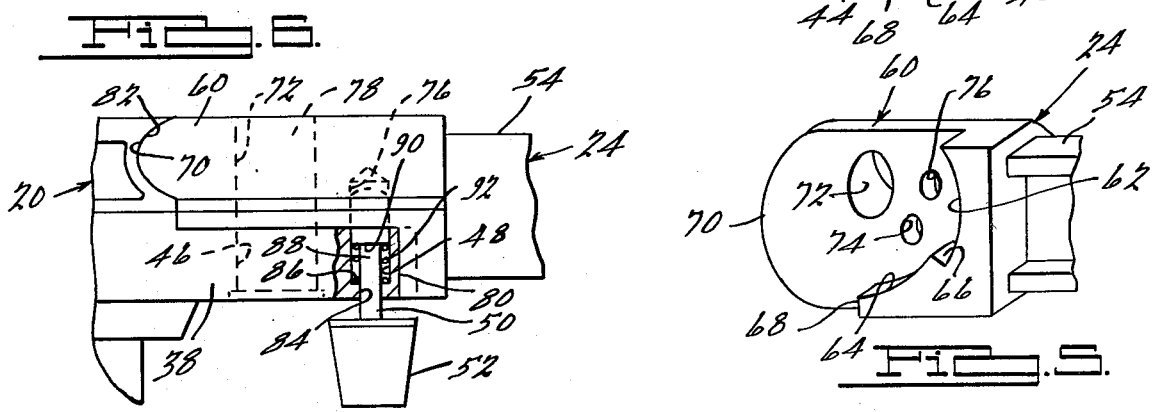
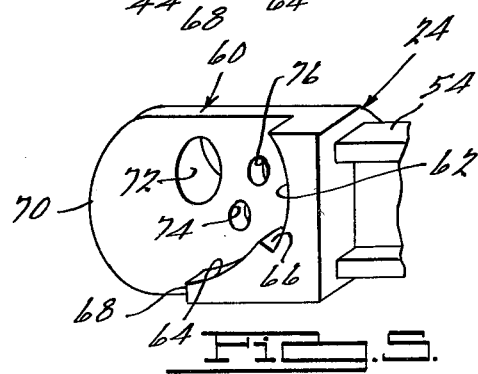

VARIABLE POSITION WIND DEFLECTOR

BACKGROUND AND SUMMARY OF THE INVENTION

The present invention relates generally to wind deflectors and more specifically to such wind deflectors in which the relative position of the deflector member may be easily varied.

Wind deflectors have been developed for use on motor vehicles and particularly station wagons to direct a portion of the air flowing over the moving vehicle downward so as to thereby prevent eddy currents from depositing road dust and the like upon the outer surface of the rear window. Such devices have become extremely popular particularly in combination with luggage racks secured to a roof portion of the motor vehicle as they have proven very effective in maintaining clear rearward visibility. However, such deflectors create a continuous drag on the vehicle to which they are secured which tends to reduce the mileage of such vehicles. Thus, in some situations such as when traveling in relatively clean areas it may be desirable to be able to move the deflector into a minimum deflection position so as to minimize the drag created thereby and maximize gasoline economy. While some wind deflectors which are adapted to fit a variety of motor vehicles do provide an adjustable feature for positioning of the deflector, the mechanism for effecting this change of position is not generally suitable nor convenient for routine use.

The present invention, however, provides a wind deflector assembly having a deflector supported in a pair of spaced frame members which are hingedly connected to support means so as to facilitate changing the position of the deflector. The frame members are also provided with locking means for securing the wind deflector in any desired position. Thus, an individual desiring to reposition the wind deflector of the present invention need merely release the locking means, reposition the deflector and the locking means will retain the deflector in the selected position.

Additional advantages and features of the present invention will become apparent from the following description of the preferred embodiment taken in conjunction with the accompanying drawings and the appended claims.

BRIEF DESCRIPTION OF THE DRAWINGS

FIG. 1 is a perspective view of a variable position wind deflector assembly in accordance with the present invention illustrated in operative relationship to a portion of a motor vehicle;

FIG. 2 is an enlarged perspective view of a portion of a wind deflector assembly and associated support means illustrating the hinge connection therebetween;

FIG. 3 is an elevational view of the deflector frame member and associated support member with the deflector illustrated in a raised position;

FIG. 4 is an enlarged detail view of an end portion of the deflector frame member in accordance with the present invention;

FIG. 5 is a perspective view of an end portion of the support member illustrating the pivotal hinge connection portion thereof; and FIG. 6 is an enlarged plan view of the connection between the support member and deflector frame member.

DESCRIPTION OF THE PREFERRED EMBODIMENT

Referring now to FIG. 1, there is shown therein a portion of a motor vehicle 10 having a luggage rack 12 secured to a roof portion 14 thereof. A variable position wind deflector assembly 16 in accordance with the present invention is secured to the rear portion of rack 12 and includes a transversely extending elongated deflector blade 18 supported at its opposite ends by deflector frame members 20 and 22. Each of deflector frame members 20 and 22 are in turn hingedly secured to support members 24 and 26 connected to longitudinally extending rail members 28 and 30 of rack 12. While variable position wind deflector assembly 16 is illustrated and described herein as being supported upon a portion of a luggage rack, it should be noted that it may also easily be secured to and supported directly on a portion of the motor vehicle should this be desirable. As deflector frame member 20 and associated support member 24 are substantially identical to frame member 22 and associated support member 26, only one such assembly will be described in detail below with reference to FIGS. 2 through 6.

As previously mentioned and more clearly seen in FIG. 2, wind deflector assembly 16 includes a deflector blade 18 which is received in a suitably contoured elongated slot 32 provided in deflector frame member 20. Deflector blade 18 is secured within slot 32 by a pair of set screws 34 and 36 provided in deflector frame member 20. A reduced thickness portion 38 is provided on the upper end portion of deflector frame member 20 and includes a pair of shoulders 40 and 42 at upper and lower ends of a generally arcuate shaped interconnecting surface 44, shoulder 40 being formed by outwardly projecting tab portion 45. A relatively large diameter opening 46 is also provided extending through deflector frame member 20 and has a center coaxial with the center of the radius of curvature of arcuate shaped surface 44. Deflector frame member 20 also is provided with a smaller diameter opening 48 spaced from opening 46 toward arcuate surface 44. Opening 48 is adapted to accommodate locking means comprising a pin member 50 extending therethrough which is provided with a suitable knob 52 secured to one end thereof.

Support member 24, as best seen in FIGS. 2, 3, and 5, includes a mounting portion 54 having a cross-sectional shape suitable to be interfitted within an end portion of rail member 28. A pair of openings 56 and 58 are provided in portion 54 so as to accommodate fastening means for securing portion 54 within rail member 28. Support member 24 is also provided with a reduced thickness portion 60 partially defined by arcuate surfaces 62 and 64, interconnecting shoulder 66 and lower shoulder 68. Support member 24 is also provided with a curved terminal end portion 70 and further includes a relatively large diameter opening 72 coaxially positioned with the center of the radius of curvature of surfaces 62 and 64. A pair of relatively smaller diameter spaced openings 74 and 76 are provided between arcuate surfaces 62 and 64 and the large diameter opening 72.

As best seen with reference to FIGS. 2 and 6, deflector frame member 20 and support member 24 are pivotally hinged with respective reduced thickness portions 38 and 60 in overlapping relationship by pin 78 extending through openings 46 and 72. Surfaces 64 and 44 as well as surfaces 62 and 80 of support member 24 and frame member 20 respectively will thus be placed in close proximity to one another. Similarly arcuate surface 70 of support member 24 will be in close proximity to a complementary shaped surface 82 of deflector frame member 20. When deflector blade 18 is moved into a lowered position such as is illustrated in FIG. 2, shoulders 42 and 68 of deflector frame member 20 and support member 24 will be brought into mutual engagement thereby preventing further pivotal downward movement. Similarly, as deflector blade 18 is pivoted upwardly, shoulder portions 40 and 66 of frame member 20 and support member 24 will be brought into mutual engagement so as to limit further upward pivotal movement.

In order to secure deflector blade 18 in either a lowered or raised position such as is illustrated in FIGS. 2 and 3 respectively, pin 50 is movably positioned within opening 48 so as to enable it to be moved into engagement with respective of openings 74 and 76. Preferably, opening 48 will be provided with a reduced diameter portion 84 forming a shoulder 86 and pin 50 will similarly have a reduced diameter portion 88 provided thereon forming a shoulder 90. A biasing means such as a helical coil spring 92 may then be provided with opposite ends abutting shoulders 86 and 90 so as to bias pin 50 into engagement with openings 74 and 76 as opening 48 is moved into alignment therewith. Knob 52 enables an individual to easily withdraw pin 50 out of the engaged opening thereby enabling the deflector blade 18 to be easily repositioned by merely pivoting frame member 20 upwardly or downwardly with respect to support member 24. While only two such locking positions are illustrated herein, it should be noted that any desired number may be provided so as to allow deflector blade 18 to be secured in a number of intermediate positions should this be desirable.

While it will be apparent that the preferred embodiment of the present invention is well calculated to provide the features and advantages above stated, it will be appreciated that the invention is susceptible to modification, variation and change without departing from the proper scope or fair meaning of the subjoined claims.

I claim:

1. A combination luggage carrier and wind deflector assembly adapted to be mounted on a vehicle having a generally flat roof portion terminating adjacent its rearward end adjacent a transversely extending, rearwardly facing window, said assembly comprising a luggage constraining structure mounted on said roof portion and including a pair of spaced parallel longitudinally extending side rails and an elongated deflector element extending generally transversely of said vehicle adjacent the rearward ends of said side rails and operable to direct at least a portion of the air flowing over said roof portion during forward movement of the vehicle toward said window, said side rails lying in a common generally horizontal plane spaced above and arranged generally parallel to said vehicle roof portion, and means supporting said deflector element on said rearward ends of said side rails for swinging movement about an axis lying generally in said imaginary horizontal plane and extending transversely of said side rails at a position directly rearwardly of the rearward ends thereof, said last mentioned means being located in general longitudinal alignment with said side rails and comprising a pair of bracket assemblies associated one with each of said side rails, each of said bracket assemblies comprising, a first bracket member including a mounting portion telescopically engageable with the rearward end of the associated side rail, and a support portion extending rearwardly of said associated side rail, a second bracket member having a rearwardly projecting portion fixedly secured to one end of said deflector element and a support portion extending forwardly of said deflector element, pivot means pivotably connecting said support portions whereby said deflector element is pivotably movable about said axis relative to said vehicle roof portion, and control means for controlling relative pivotal movement of said deflector element between a deflecting position wherein a portion of said flow of air over the vehicle is directed downwardly toward said window, and a relatively non-deflecting position wherein said element extends generally horizontally rearwardly of the vehicle so as to have relatively no affect in directing said flow of air downwardly toward said window.

2. The invention as set forth in claim 1 wherein said second bracket member of each of said assemblies comprises recess means nestingly receiving the adjacent end of said deflector element.

3. The invention as set forth in claim 2 wherein said control means comprises interengageable means on said first and second bracket members for limiting downward pivotal movement of said deflector element as said element pivots about said axis from said relatively non-deflecting position to said deflecting position.

* * * * *